United States Patent
Choi et al.

(10) Patent No.: US 10,107,569 B2
(45) Date of Patent: Oct. 23, 2018

(54) U-BEND PIPE TYPE HEAT EXCHANGER

(71) Applicant: KITURAMI BOILER CO., LTD., Gyeongsangbuk-do (KR)

(72) Inventors: Sung-Hwan Choi, Seoul (KR); Youn-cheol Shin, Seoul (KR); Tae-young Kim, Gyeongsangbuk-do (KR); Young-Hyo Jeon, Daegu (KR); Hae-Young Jung, Daegu (KR)

(73) Assignee: KITURAMI BOILER CO., LTD., Gyeongsangbuk-Do (KR)

( * ) Notice: Subject to any disclaimer, the term of this patent is extended or adjusted under 35 U.S.C. 154(b) by 0 days.

(21) Appl. No.: 15/437,979

(22) Filed: Feb. 21, 2017

(65) Prior Publication Data
US 2017/0321970 A1    Nov. 9, 2017

(30) Foreign Application Priority Data
May 3, 2016    (KR) .................. 10-2016-0054463

(51) Int. Cl.
*F28F 9/013*    (2006.01)
*F28D 1/03*    (2006.01)
(Continued)

(52) U.S. Cl.
CPC ............ *F28F 9/0131* (2013.01); *F24H 8/00* (2013.01); *F28D 1/0358* (2013.01); *F28D 1/0443* (2013.01); *F28D 7/163* (2013.01); *F28D 7/1623* (2013.01); *F28D 21/0007* (2013.01); *F28F 13/06* (2013.01); *F28F 2270/02* (2013.01); *Y02B 30/102* (2013.01)

(58) Field of Classification Search
CPC ...... F28F 9/0131; F28F 13/06; F28F 2270/02; F28D 1/0358; F28D 1/0443; F28D 7/163; F28D 7/1623; F28D 21/0007; F24H 8/00; Y02B 30/102

USPC ......................................... 165/158, 163, 152
See application file for complete search history.

(56) References Cited

U.S. PATENT DOCUMENTS

| | | | |
|---|---|---|---|
| 7,255,157 B2* | 8/2007 | Richardson | F28D 7/06 165/158 |
| 7,647,897 B2* | 1/2010 | Ootomo | F24H 1/40 122/31.1 |
| 2015/0241130 A1* | 8/2015 | Kim | F24H 8/00 165/140 |

FOREIGN PATENT DOCUMENTS

| JP | H07310988 | 11/1995 |
|---|---|---|
| KR | 20030029206 | 4/2003 |

(Continued)

*Primary Examiner* — Jianying Atkisson
*Assistant Examiner* — Joel Attey
(74) *Attorney, Agent, or Firm* — IPLA P.A.; James E. Bame

(57) ABSTRACT

A U-bend pipe type heat exchanger includes: a heat exchanger main body surrounded by a front side plate, a back side plate, a left side plate, and a right side plate, and having open upper and lower portions through which a heat source passes; a plurality of U-bend pipes inserted between the left side plate and the right side plate, each of the plurality of U-bend pipes including two heat exchange pipes arranged in parallel with each other and a U-shaped pipe connecting one end portions of the two heat exchange pipes; and a plurality of water jackets attached to at least one of outward surfaces of the left side plate and the right side plate, and connecting open end portions of two adjacent heat exchange pipes such that a low-temperature water circulates along the plurality of U-bend pipes.

3 Claims, 8 Drawing Sheets

(51) Int. Cl.
    *F24H 8/00*     (2006.01)
    *F28D 21/00*     (2006.01)
    *F28F 13/06*     (2006.01)
    *F28D 1/04*     (2006.01)
    *F28D 7/16*     (2006.01)

(56) References Cited

FOREIGN PATENT DOCUMENTS

| KR | 20100032543 | 3/2010 |
| KR | 20100115601 | 10/2010 |
| KR | 20160015945 | 2/2016 |

* cited by examiner

U-BEND PIPE TYPE HEAT EXCHANGER

CROSS REFERENCE

This application claims the benefit of Patent Application No. 10-2016-0054463, filed on May 3, 2016 with Korean Patent Office, the disclosure of which is incorporated herein its entirety by reference.

BACKGROUND

The present disclosure relates to a U-bend pipe type heat exchanger, and, more particularly, to a U-bend pipe type heat exchanger which includes a heat exchanger main body having a plurality of U-bend pipes, each of which is configured by integrating heat exchange pipes and a U-shaped pipe, and performs heat exchange between a low-temperature water and a heat source.

A heat exchanger crosses a heating fluid and a heating target fluid differing in temperature from each other to allow heat delivery therebetween, and is used to heat a low-temperature water circulating in a boiler or a water heater to supply a hot water or a heating water.

In the heat exchanger, a plurality of heat exchange pipes installed in a main body of the heat exchanger is connected with one another at both sides of the main body, whereby a low-temperature water circulates in the main body in a zigzag direction. Such heat exchanger is classified into a U-shaped pipe type or a water jacket type depending on a type of connector.

As illustrated in FIG. 1, in a U-shaped pipe type heat exchanger which is disclosed in, for example, Korean Laid-open Patent Publication No. 10-2010-0032543, a plurality of heat exchange pipes 30 is installed in a heat exchange chamber 40 and U-shaped pipes installed at side surfaces of a main body of the heat exchange chamber 40 connect neighboring heat exchange pipes 30.

As illustrated in FIG. 2, in a water jacket type heat exchanger which is disclosed in, for example, Korean Laid-open Patent Publication No. 10-2010-0115601, a plurality of heat exchange pipes 10 interposed between a first fixing plate 21 and a second fixing plate 22 is connected with one another through a parallel fluid passage caps (water jackets) 31.

However, in the U-shaped pipe type heat exchanger, the heat exchanger increases in overall size thereof because the U-shaped pipes protrude outward from the main body. Further, thermal efficiency is lowered because heat dissipation in the U-shaped pipes exposed outside generates heat loss.

The aforementioned defects of the U-shaped pipe type heat exchanger can be compensated by means of the water jacket type heat exchanger. However, the water jacket type heat exchanger does not satisfy high-level pressure-resistance test criteria. That is to say, in the water jacket type heat exchanger, deformation by pressure or damage may occur due to expansion of side surfaces of the heat exchanger by pressure or insufficient uniformity in brazing during a manufacturing process.

SUMMARY OF THE INVENTION

Some embodiments of the present disclosure provide a U-bend pipe type heat exchanger which prevents U-shaped pipes from being exposed outside of a main body of the heat exchanger and minimizes a use of water jackets, thereby reducing an overall size of the heat exchanger, suppressing heat loss, and achieving a high pressure-resistance.

According to one embodiment of the present disclosure, there is provided a U-bend pipe type heat exchanger, including: a heat exchanger main body surrounded by a front side plate, a back side plate, a left side plate, and a right side plate, and having open upper and lower portions through which a heat source passes; a plurality of U-bend pipes inserted between the left side plate and the right side plate, each of the plurality of U-bend pipes including two heat exchange pipes arranged in parallel with each other and a U-shaped pipe connecting one end portions of the two heat exchange pipes; and a plurality of water jackets attached to at least one of outward surfaces of the left side plate and the right side plate, and connecting open end portions of two adjacent heat exchange pipes such that a low-temperature water circulates along the plurality of U-bend pipes. The U-shaped pipe of each of the U-bend pipes is fixed to an inward surface of one of the left side plate and the right side plate, and another end portions of the two heat exchange pipes are inserted to another one of the left side plate and the right side plate and connected to the water jackets.

In some embodiment, each of the plurality of U-bend pipes may be an oval pipe having an oval cross section.

In some embodiments, at least one U-shaped pipe fixing part to which the U-shaped pipe of each of the U-bend pipes may be inserted and fixed is installed in at least one of the left side plate and the right side plate. The at least one U-shaped pipe fixing part may be configured by an assembly groove formed in the inward surface of the right side plate and the assembly groove may be a portion of the right side plate protruding outward.

In some embodiments, the plurality of U-bend pipes may include: a CO reduction heat exchange pipe which is installed in a position spaced apart downwardly from the upper portion of the heat exchanger main body by a predetermined distance and has a first CO heat exchange pipe and a second heat exchange pipe arranged in parallel with each other; and a plurality of main heat exchange pipes installed below the CO reduction heat exchange pipe, each of the plurality of main heat exchange pipes having a heat exchange pin installed in an outer peripheral surface of each of the plurality of main heat exchange pipes.

In some embodiments, one of two heat exchange pipes constituting the first CO heat exchange pipe may be fixed to the front side plate, and one of two heat exchange pipes constituting the second CO heat exchange pipe may be fixed to the back side plate.

In some embodiments, the U-bend pipe type heat exchanger may further include: an auxiliary heat exchange pipe installed above the CO reduction heat exchange pipe, wherein two heat exchange pipes constituting the auxiliary heat exchange pipe are fixed to the front side plate and the back side plate, respectively.

According to the embodiment of the present disclosure, U-bend pipes, each of which is a single integrated body of heat exchange pipes and a U-shaped pipe, are inserted into and assembled inside of a heat exchanger main body, and only open end portions of the U-bend pipes are connected by water jackets.

Therefore, the use of water jackets can be minimized while preventing the U-shaped pipes from being exposed outside. Further, it is possible to provide a high pressure-resistance while suppressing an increase in overall size of a heat exchanger and heat loss.

DETAILED DESCRIPTION OF THE INVENTION

Hereinafter, a U-bend pipe type heat exchanger according to an embodiment of the present disclosure will be described in detail with reference to the accompanying drawings.

In the following description, a side where a burner is installed and an opposite side thereto are defined as an "upper side" and a "lower side," respectively. However, it would be obvious that definition of the upper and lower sides may be reversed according to an installation position of the burner.

In addition, in the following description, a main body of a heat exchanger is divided into front, back, left, and right side plates. However, it would be obvious that forward, backward, leftward, and rightward directions may be varied depending on a viewpoint.

Figure 3:
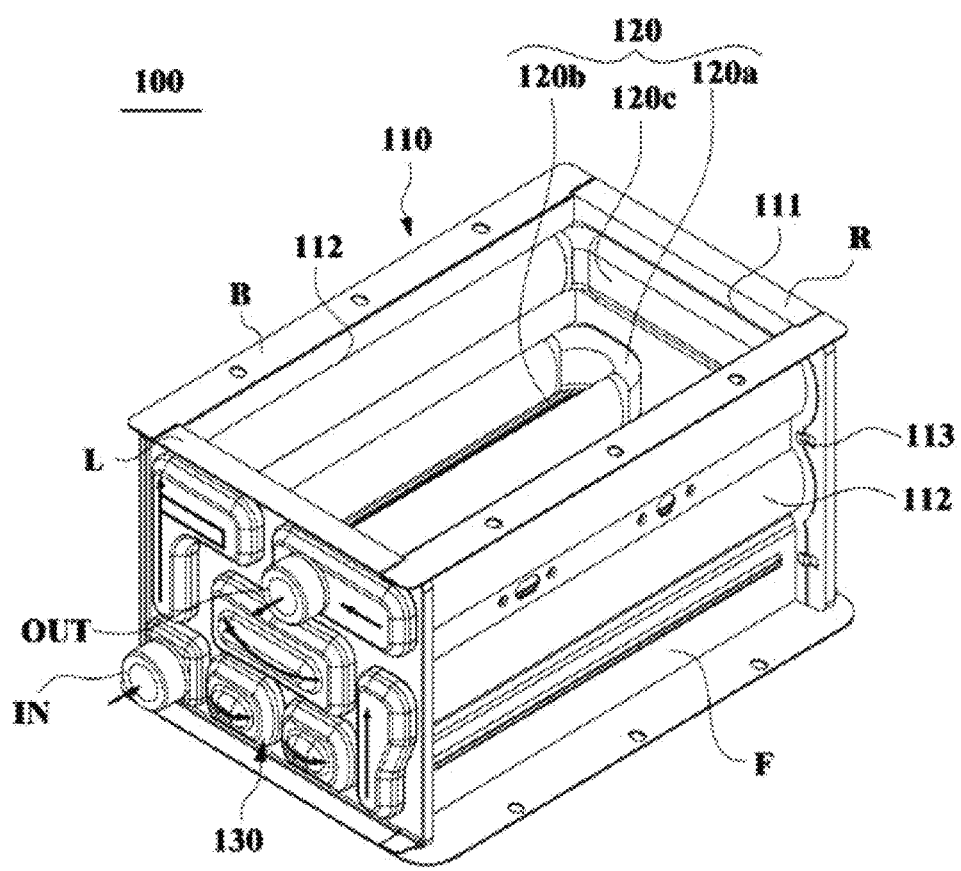
FIG. 3 illustrates a perspective view of a U-bend pipe type heat exchanger according to an embodiment of the present disclosure.
Figure 4:
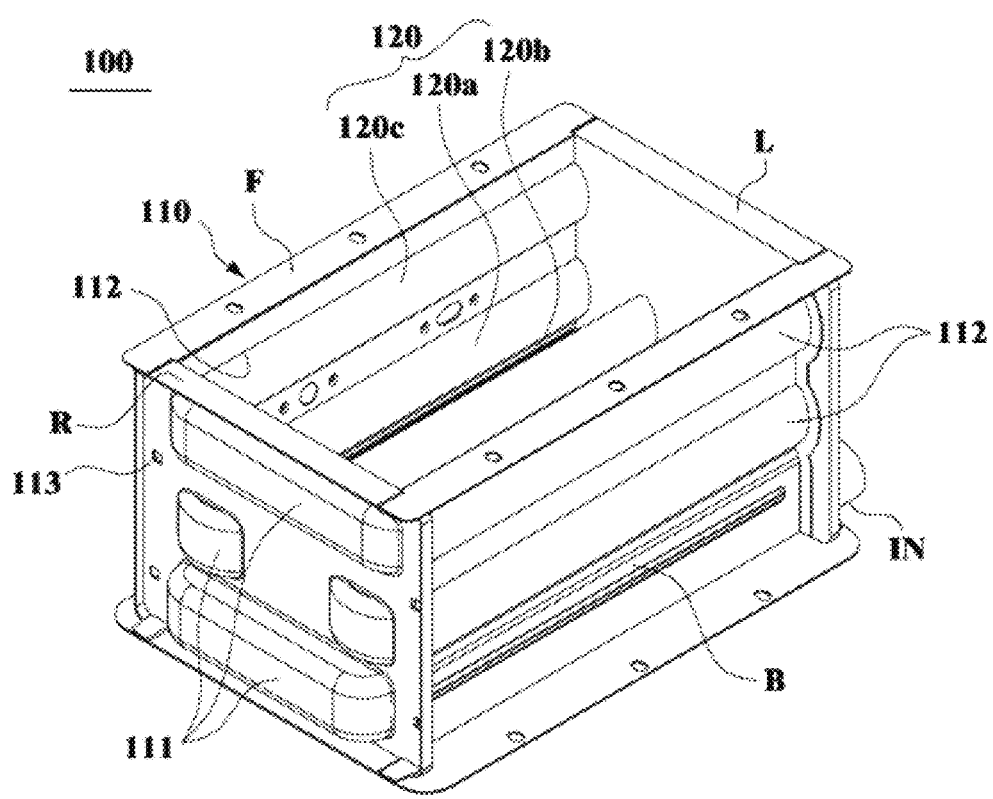
FIG. 4 illustrates another perspective view of the U-bend pipe type heat exchanger according to the embodiment of the present disclosure.
Figure 5:
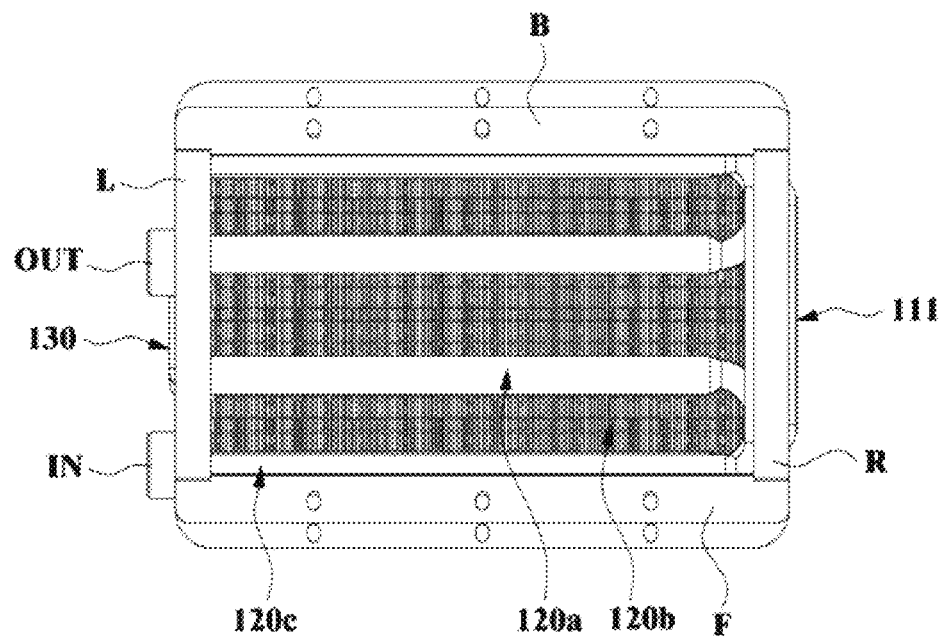
FIG. 5 illustrates a plane view of the U-bend pipe type heat exchanger according to the embodiment of the present disclosure.

FIG. 3 illustrates a perspective view of a U-bend pipe type heat exchanger according to an embodiment of the present disclosure. FIG. 4 illustrates another perspective view of the U-bend pipe type heat exchanger according to the embodiment of the present disclosure. FIG. 5 illustrates a plane view of the U-bend pipe type heat exchanger according to the embodiment of the present disclosure.

As illustrated in FIGS. 3 to 5, a U-bend pipe type heat exchanger according to an embodiment of the present disclosure includes a heat exchanger main body 110 through which a heat source passes, a plurality of U-bend pipes 120 along which a low-temperature water circulates, and water jackets 130 connecting the U-bend pipes 120.

A low-temperature water introduced from a water inlet IN circulates along the U-bend pipes 120 and is then discharged out through a water outlet OUT. Heat exchange between the low-temperature water and the heat source is carried out during this circulation. The low-temperature water heated through the heat exchange is supplied as a hot water or a heating water.

Each of the U-bend pipes 120, which is a single integrated body of heat exchange pipes 121 and a U-shaped pipe 122, is assembled inside of the heat exchange main body 110 and open end portions of the U-bend pipes 120, which are disposed at one side, are connected by the water jackets 130.

With this configuration, the U-shaped pipes 122 are prevented from being exposed outside of the heat exchanger main body 110 and the use of the water jackets 130 is minimized, thereby providing a high pressure-resistance while suppressing an increase in overall size of the heat exchanger and heat loss.

More specifically, the heat exchanger main body 110 forms a main body of, for example, a sensible heat exchanger (referred to also as a primary heat exchanger) and includes a front side plate F, a back side plate B, a left side plate L, and a right side plate R.

Figure 6:
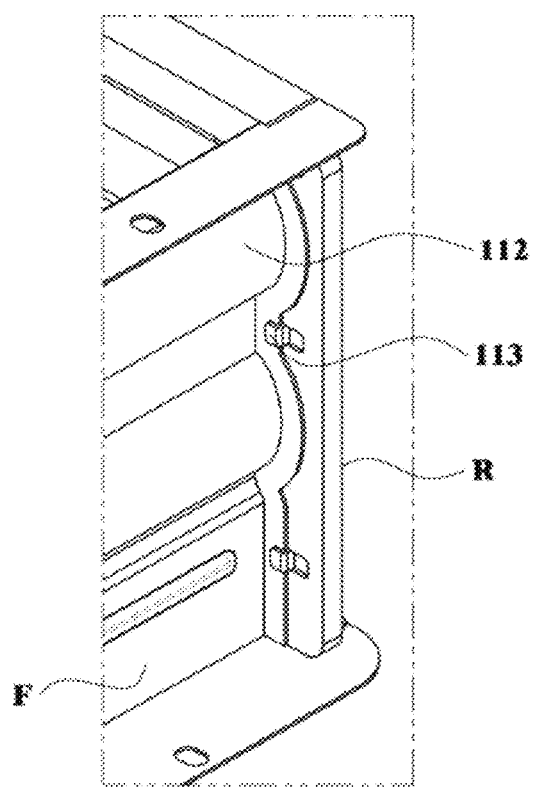
FIG. 6 illustrates a side plate connector of the U-bend pipe type heat exchanger according to the embodiment of the present disclosure.

The side plates F, B, L, and R are combined by, for example, welding in a state where they are arranged in predetermined frontward, backward, leftward, and rightward positions, respectively. In some embodiments, as illustrate in FIG. 6, portions of the left side plate L and the right side plate R are punched to form protruding connectors 113 and the front side plate F and the back side plate B are pressed and fixed by the connectors 113. In this state, the side plates F, B, L, and R can be easily welded together.

The heat exchanger main body 110 assembled as such has open upper and lower portions to facilitate a downward discharge of a high-temperature combustion gas introduced from a combustion chamber arranged above the heat exchanger main body 110. A top-down type premix gas burner may be installed above the heat exchanger main body 110.

In a conventional condensing burner, a premix gas burner, a combustion chamber, a sensible heat exchanger, a latent heat exchanger, and a discharging part are arranged in a top-down order. The heat exchanger main body 110 according to the embodiment of the present disclosure is used as the sensible heat exchanger.

Next, the U-bend pipe 120 is inserted between the left side plate L and the right side plate R and assembled inside of the heat exchanger main body 110. A plurality of U-bend pipes 120 is installed inside of the heat exchanger main body 110 and each of the U-bend pipes 120 serves as a unit of a heat exchange pipe system.

Figure 7:
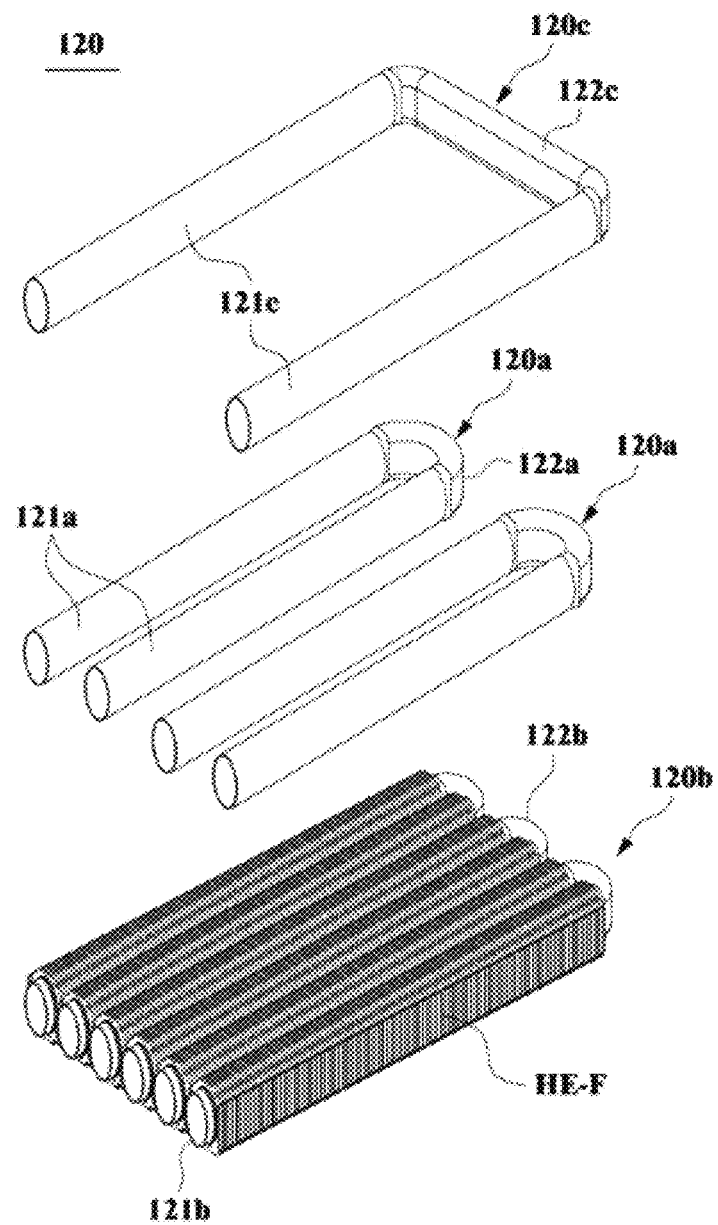
FIG. 7 illustrates U-bend pipes of the U-bend pipe type heat exchanger according to the embodiment of the present disclosure.

As illustrate in FIG. 7, each of the plurality of U-bend pipes 120 (120a, 120b, and 120c) includes two heat exchange pipes 121 (121a, 121b, and 121c) arranged in parallel with each other and a U-shaped pipe 122 (122a, 122b, and 122c) connecting one end portions of the two heat exchange pipes 121 with one another. Thus, each of the U-bend pipes 120 is bent in an overall U-shape.

Each of the U-bend pipe 120 is prepared in advance by inserting and welding the U-shaped pipe 122 to the two heat exchange pipes 121 prior to a heat exchanger assembly process, and thus prepared U-bend pipes 120 are assembled inside of the heat exchange main body 110, i.e., without being exposed outside.

The U-bend pipes 120 are classified into three types including a CO reduction heat exchange pipe 120a for reducing carbon monoxide, a main heat exchange pipe 120b for improving thermal efficiency, and an auxiliary heat exchange pipe 120c for reinforcement.

As will be described later in detail, the CO reduction heat exchange pipe 120a, the main heat exchange pipe 120b, and the auxiliary heat exchange pipe 120c are arranged in a middle stage, a lower stage, and an upper stage, respectively, and carry out their inherent roles.

The U-bend pipes 120 illustrated in FIGS. 3 and 4 are arranged to have all of the open end portions thereof face one side, for example, the left side plate L. Thus, productivity can be improved by installing the plurality of water jackets 130 at the one side.

Alternatively, unlike the configuration illustrated in FIGS. 3 and 4, some of the U-bend pipes 120 may be arranged to have their open end portions face another side, for example, the right side plate R. In this case, the water jackets 130 are distributedly installed on the one side and the another side depending on arrangement directions of their corresponding U-bend pipes 120.

Next, each of the water jackets 130 connects two adjacent U-bend pipes 120. In this manner, the plurality of U-bend pipes 120 is sequentially connected.

Specifically, one of two heat exchange pipes constituting one U-bend pipe 120 is connected to one of two heat exchange pipes constituting another U-bend pipe 120, thereby connecting two U-bend pipes 120.

By connecting the plurality of U-bend pipes 120 using the plurality of water jackets 130 as described above, a low-temperature water flows sequentially along all of the plurality of U-bend pipes 120 (arrows in FIG. 3 indicate a flow direction of the low-temperature water).

Among the water jackets 130, two water jackets 130 installed in the left and right uppermost portions are configured to have an L-shape and a straight shape, respectively, so as to reinforce portions other than connecting positions of the pipes. Thus, it is possible to prevent thermal deformation or damage due to an effect of heat generated during a burner combustion.

In some embodiments, an additional heating water flow passage may be formed in the water jackets 130 to absorb the heat generated during the burner combustion in the water jackets 130 itself and prevent thermal deformation or damage in the left side plate L.

Such water jackets 130, which are also referred to as "fluid passage caps" or "water houses", are fixed to the side plate of the heat exchanger main body 110 by brazing and form a fluid passage between the water jackets 130 and the side plate of the heat exchanger main body 110. The water jackets 130 connect the open end portions of the U-bend pipes 120 inserted to the side surface of the heat exchanger main body 110.

The water jackets 130 are attached to at least one of the left side plate L and the right side plate R depending on the arrangement directions of the U-bend pipes 120. In a case where the U-bend pipes 120 have the same arrangement direction as illustrated in FIGS. 3 and 4, all of the water jackets 130 are installed in the left side plate L.

However, as described above, the water jackets 130 may be installed also in the left side plate L and the right side plate R depending on directions of the open end portions of the U-bend pipes 120. That is to say, in a case where the U-bend pipes 120 are arranged such that some of the U-bend pipes 120 face leftward while another U-bend pipes 120 face rightward, the water jackets 130 are distributedly installed in the left side plate L and the right side plate R.

As described above, according to the embodiment of the present disclosure, the U-shaped pipes 122 of the U-bend pipes 120 are fixed to the inward surface of the left side plate L or the right side plate R, while another end portions of the two heat exchange pipes 121 are inserted to a side plate opposite to the side plate where the U-shaped pipes 122 are fixed and connected to the water jackets 130.

For example, as illustrated in FIGS. 3 and 4, the U-shaped pipes 122 of the U-bend pipes 120 are fixed to the inward surface of the right side plate R, while the open end portions of the heat exchange pipes 121 are fixed to the left side plate L and the water jackets 130 are installed in the outward surface of the left side plate L.

Figure 1:
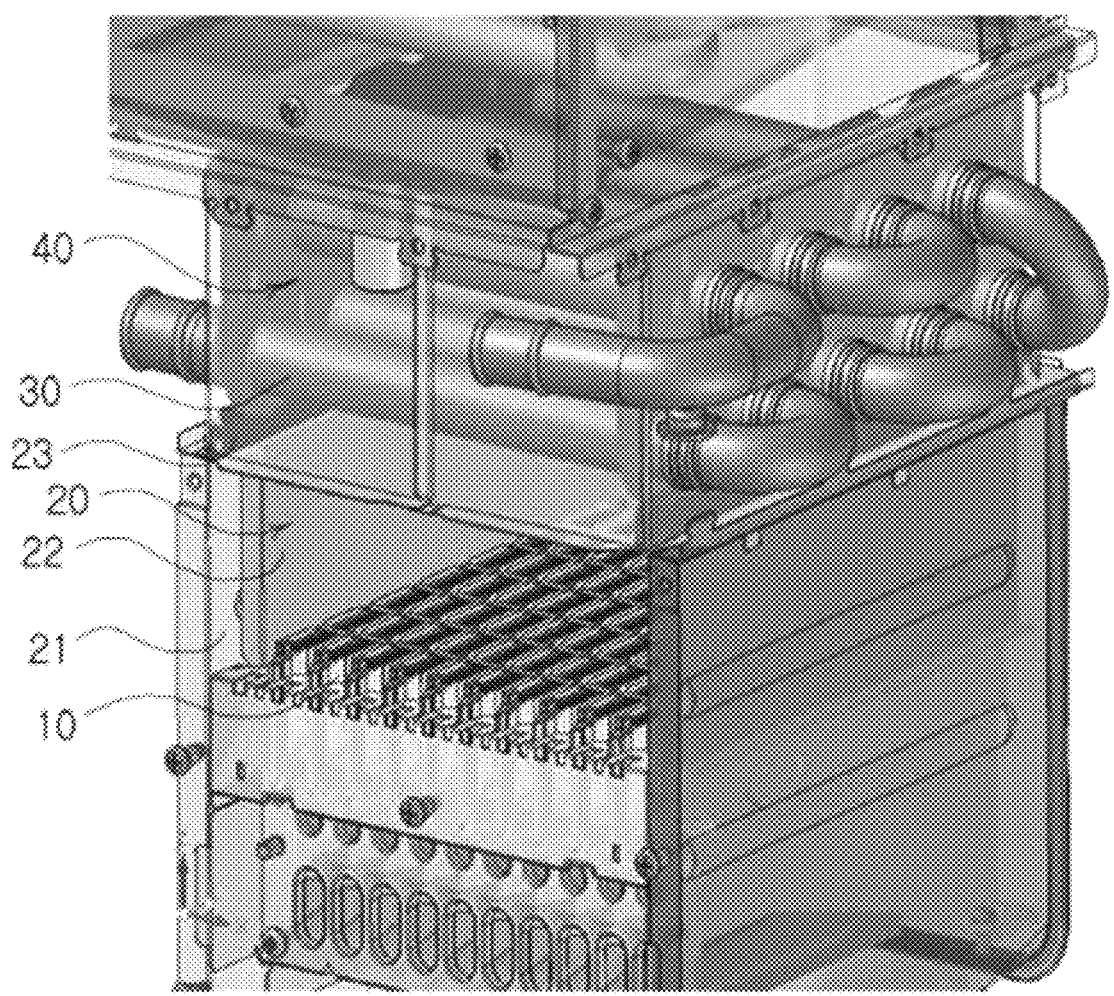
FIG. 1 illustrates a perspective view of a conventional U-shaped pipe type heat exchanger.

According to the embodiment of the present disclosure, on the contrary to the related art illustrated in FIG. 1 in which the U-shaped pipes protrude and are exposed from the heat exchange chamber 40, the U-shaped pipes 122 are placed inside of the heat exchanger main body 110. Therefore, it is possible to reduce the overall size of the heat exchanger and also prevent deterioration in thermal efficiency due to a heat dissipation to the outside.

Figure 2:
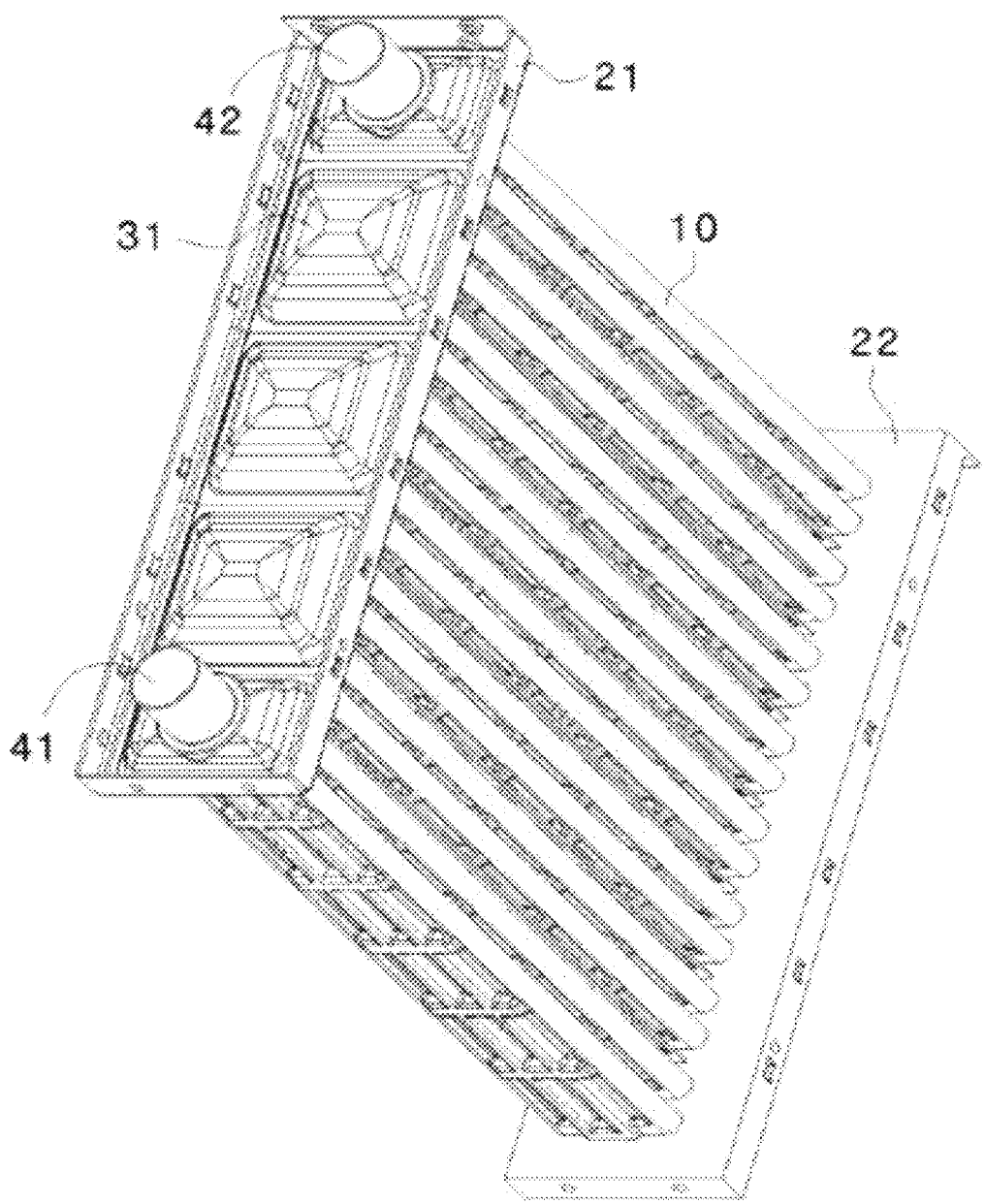
FIG. 2 illustrates a partial view of a conventional water jacket type heat exchanger.

Also, according to the embodiment of the present disclosure, on the contrary to the related art illustrated in FIG. 2 in which both end portions of the heat exchange pipes are open, only one end portions of the heat exchange pipes 121 are open (the other end portions are connected by the U-shaped pipes). Therefore, it is possible to reduce the number of water jackets 130 connecting the open end portions by half while improving a pressure-resistance.

In some embodiments, each of the U-bend pipes 120 is an oval pipe having an oval cross section. That is to say, all of the two heat exchange pipes 121 and the U-shaped pipe 122 in some embodiments are a pipe having an oval cross section and made of various material such as stainless steel, for example.

As can be seen from the known total Nusselt number, an oval pipe having an oval (or an egg-shaped) cross section has a heat conductivity higher than that of a pipe having a circular cross section and thus has higher thermal efficiency.

In addition, the U-bend pipes 120 having an oval cross section has a coefficient of friction of about 40% comparing to the pipes having a circular cross section. Thus, it is possible to reduce a friction pressure loss due to the pipes and allow a smooth flow of the heat source.

In some embodiments, in at least one of the left side plate L and the right side plate R constituting the heat exchanger main body 110, U-shaped pipe fixing parts 111 to which the U-shaped pipes 122 of the U-bend pipes 120 are inserted and fixed are installed.

As the U-shaped pipe fixing parts 111, clamps which are fixed to the side plates while surrounding the outer peripheral surfaces of the U-shaped pipes 122, mounting stages having upper portions on which the U-shaped pipes 122 are mounted, assembly grooves to which the U-shaped pipes 122 are inserted, or the like may be used.

Figure 8:
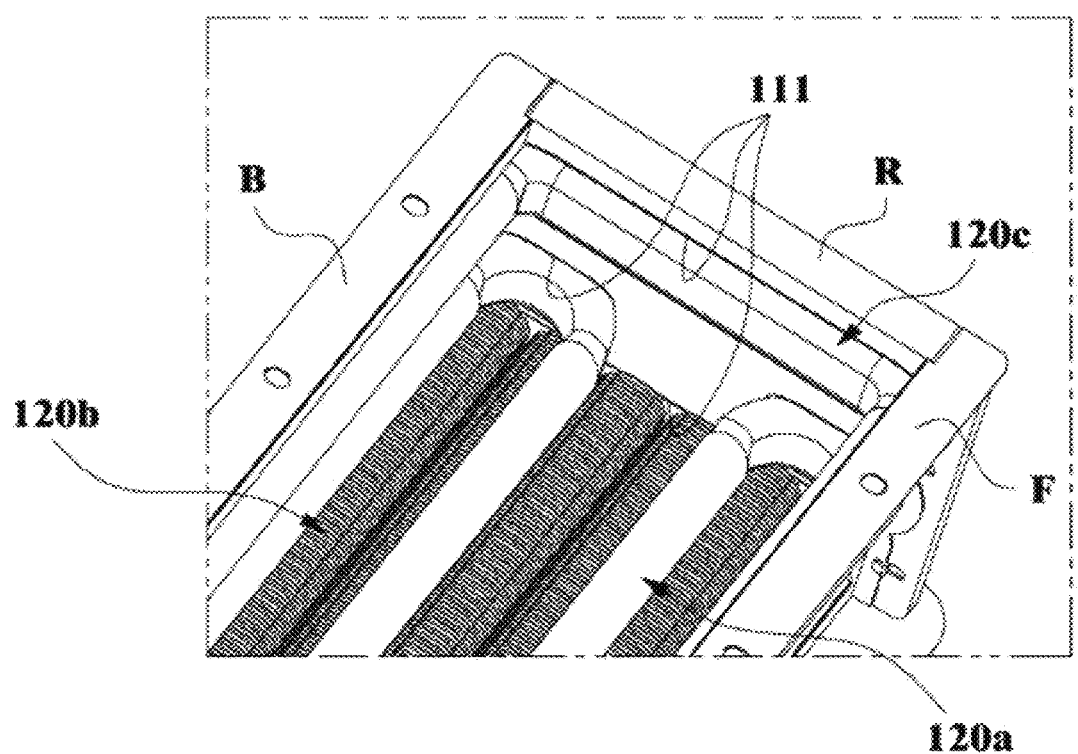
FIG. 8 illustrates a partial enlarged view of a fixing part illustrated in FIG. 3.

In particular, as enlargedly illustrated in FIG. 8, in a case where the assembly grooves are used as the U-shaped pipe fixing parts 111, one-touch assembly can be made by inserting the U-shape pipes 122 to the assembly grooves only.

Such assembly grooves 111 may be formed by pressing portions of the right side plate R and/or the left side plate L such that the portions protrude outward. If necessary, the U-shaped pipes 122 inserted to the assembly grooves may be welded, for example, by brazing.

Accordingly, the U-shaped pipes 122 of the U-bend pipes 120 can be easily assembled without being exposed outside of the heat exchanger main body 110. Thus, productivity of the heat exchanger can be significantly improved.

In some embodiments, long grooves 112 having an enough length such that the heat exchange pipes 121 of the U-bend pipes 120 can be inserted to the long grooves 112 are formed in the front side plate F and the back side plate B. The long groves 112 serve as an assembly mechanism for the heat exchange pipes 121. Due to the long grooves 112, the U-bend pipes 120 can be detachably assembled and the heat exchanger main body 110 can be reinforced.

In some embodiments, the U-bend pipes 120 include the CO reduction heat exchange pipe 120a, the main heat exchange pipe 120b, and the auxiliary heat exchange pipe 120c, which are classified according to inherent roles thereof.

The CO reduction heat exchange pipe 120a includes two U-bend pipes 120, i.e., a first CO heat exchange pipe and a second CO heat exchange pipe, arranged in parallel with each other, and is installed in a position spaced apart downwardly from the upper portion of the heat exchanger main body 110 by a predetermined distance, for example, in a middle-height position of the heat exchanger main body 110.

The CO reduction heat exchange pipe 120a serves as a heat exchange pipe while preventing a high-temperature combustion gas from starting heat exchange immediately after the combustion gas is introduced to the inside of the heat exchanger main body 110 from a combustion chamber of a burner.

The combustion gas contains a large amount of CO (carbon monoxide). If the heat exchange is made rapidly before a chemical reaction in which CO reacts with $O_2$ and is converted to $CO_2$ occurs, the combustion gas is cooled rapidly and CO is discharged as it is without being subjected to the above chemical reaction.

Therefore, according to the embodiment of the present disclosure, a slow temperature grade is provided such that the temperature of the combustion gas decreases slowly and CO is chemically converted to $CO_2$, thereby reducing a discharge amount of harmful substances.

More specifically, one of the two heat exchange pipes 121a constituting the first CO heat exchange pipe 120a is fixed to the front side plate F and one of the two heat exchange pipes 121a constituting the second CO heat exchange pipe 120a is fixed to the back side plate B, so as to arrange the former one and the latter one to face each other.

By installing the CO reduction heat exchange pipe 120a with the aforementioned arrangement, the first CO heat exchange pipe and the second CO heat exchange pipe can provide a stiffening force while being fixed to the front side plate F and the back side plate B, respectively. Thus, the pressure-resistance can be improved under a high-temperature operation environment.

Further, since the first CO heat exchange pipe and the second CO heat exchange pipe form a space therebetween while being spaced apart downwardly from the burner by a predetermined distance, a rapid cooling of the combustion gas can be prevented. Thus, generation of CO can be reduced and the combustion gas can flow smoothly.

Next, the main heat exchange pipe 120b performs main heat exchange with the heat source generated in the burner of the combustion chamber installed above the heat exchanger main body 110. Heat exchange pins HE_F for improving heat delivery efficiency are installed in the outer peripheral surfaces of the heat exchange pipes 121b constituting the main heat exchange pipe 120b.

The main heat exchange pipe 120b is installed below the CO reduction heat exchange pipe 120a, i.e., at a downstream side in a flow direction of the combustion gas). The main heat exchange pipe 120b has a configuration in which a plurality of, for example, three, U-bend pipes 120 is arranged horizontally in parallel with one another.

Since the heat exchange pins HE-F are attached on the outer peripheral surfaces of the heat exchange pipes 121b, the main heat exchange pipe 120b is not inserted to the long grooves formed in the front side plate F and the back side plate B. Instead, the main heat exchange pipe 120b is fixed to at least one of the assembly mechanisms formed in the left side plate L and the right side plate R.

Next, the auxiliary heat exchange pipe 120c serves to reduce CO, carry out auxiliary heat exchange, and reinforce the pressure-resistance of the heat exchanger main body 110, and is installed above the CO reduction heat exchange pipe 120a.

In the configuration of the auxiliary heat exchange pipe 120c, the two heat exchange pipes 121c are fixed to the front side plate F and the back side plate B, respectively, and the U-shaped pipe 122 is fixed to the left side plate L or the right side plate R.

The auxiliary heat exchange pipe 120c is configured by one U-bend pipe 120 while two heat exchange pipes 121c are fixed to the front side plate F and the back side plate B, respectively. Thus, the length of the U-shaped pipe 122c is longer than those of the U-shaped pipes 122a and the 122b of the CO reduction heat exchange pipe 120a and the main heat exchange pipe 120b.

The auxiliary heat exchange pipe 120c is also assembled by inserting the U-shaped pipe 122c to the assembly groove 111, i.e., the assembly mechanism, which is formed in the left side plate L or the right side plate R, and inserting the two heat exchange pipes 121c to the long grooves 112 formed in the front side plate F and the back side plate B.

While certain embodiments have been described, these embodiments have been presented by way of example only, and are not intended to limit the scope of the disclosure. Indeed, the embodiments described herein may be embodied in variety of other forms. Furthermore, various omissions, substitutions and change in the form of the embodiments described herein may be made without departing from the spirit of the disclosures. The accompanying claims and their equivalents are intended to cover such forms of modifications as would fall within the scope and spirit of the disclosures.

What is claimed is:

1. A U-bend pipe type heat exchanger, comprising:
a heat exchanger main body surrounded by a front side plate, a back side plate, a left side plate, and a right side plate, and having open upper and lower portions through which a heat source passes;
a plurality of U-bend pipes inserted between the left side plate and the right side plate, each of the plurality of U-bend pipes including two heat exchange pipes arranged in parallel with each other and a U-shaped pipe connecting one end portion of each of the two heat exchange pipes; and
a plurality of water jackets attached to at least one of outward surfaces of the left side plate and the right side plate, and connecting open end portions of two adjacent heat exchange pipes such that a low-temperature water circulates along the plurality of U-bend pipes,
wherein the U-shaped pipe of each of the U-bend pipes is fixed to an inward surface of one of the left side plate and the right side plate, and another end portion of each of the two heat exchange pipes being inserted to another one of the left side plate and the right side plate and connected to the water jackets,
wherein at least one U-shaped pipe fixing part to which the U-shaped pipe of each of the U-bend pipes is inserted and fixed is installed in at least one of the left side plate and the right side plate, the at least one U-shaped pipe fixing part being configured by an assembly groove formed in the inward surface of the right side plate, and the assembly groove being a portion of the right side plate protruding outward,
wherein the plurality of U-bend pipes includes: a CO reduction heat exchange pipe which is installed in a position spaced apart downwardly from the upper portion of the heat exchanger main body and has a first CO heat exchange pipe and a second heat exchange pipe arranged in parallel with each other; and a main heat exchange pipe installed below the CO reduction heat exchange pipe, the main heat exchange pipe having a heat exchange pin installed in an outer peripheral surface of the main heat exchange pipe,
wherein each U-shaped pipe of the CO reduction heat exchange pipe is inserted to one of the at least one U-shape pipe fixing part configured by the assembly groove formed in the right side plate, and each U-shaped pipe of the main heat exchange pipes is inserted to another one of the at least one U-shape pipe fixing part configured by the assembly groove formed in the right side plate,
wherein one of two heat exchange pipes constituting the first CO heat exchange pipe is fixed to the front side plate, and one of two heat exchange pipes constituting the second CO heat exchange pipe is fixed to the back side plate.

2. The U-bend pipe type heat exchanger of claim 1, wherein each of the plurality of U-bend pipes is an oval pipe having an oval cross section.

3. The U-bend pipe type heat exchanger of claim 1, further comprising:
an auxiliary heat exchange pipe installed above the CO reduction heat exchange pipe, wherein two heat exchange pipes constituting the auxiliary heat exchange pipe are fixed to the front side plate and the back side plate, respectively.

* * * * *